United States Patent
Ma et al.

(10) Patent No.: US 12,487,684 B2
(45) Date of Patent: Dec. 2, 2025

(54) SIGNAL TRANSMISSION BETWEEN ELECTRONIC DEVICE AND KEYBOARD USING HIGH/LOW PASS FILTERS

(71) Applicant: Honor Device Co., Ltd., Shenzhen (CN)

(72) Inventors: Lei Ma, Shenzhen (CN); Bo Ma, Shenzhen (CN); Chengyu Ma, Shenzhen (CN); Yingke Fu, Shenzhen (CN); Chao Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/689,639

(22) PCT Filed: Sep. 8, 2023

(86) PCT No.: PCT/CN2023/117670
§ 371 (c)(1),
(2) Date: Mar. 6, 2024

(87) PCT Pub. No.: WO2024/061023
PCT Pub. Date: Mar. 28, 2024

(65) Prior Publication Data
US 2025/0123694 A1   Apr. 17, 2025

(30) Foreign Application Priority Data
Sep. 23, 2022 (CN) .......................... 202211161307.0

(51) Int. Cl.
*G06F 3/023* (2006.01)
*G06F 3/02* (2006.01)
*H01H 13/81* (2006.01)

(52) U.S. Cl.
CPC ............ *G06F 3/023* (2013.01); *G06F 3/0213* (2013.01); *H01H 13/81* (2013.01)

(58) Field of Classification Search
CPC ........................................................ G06F 3/023
(Continued)

(56) References Cited

U.S. PATENT DOCUMENTS 9,497,054 B1 * 11/2016 Li ....................... H04L 25/0264
2007/0284949 A1   12/2007 Voll et al.
(Continued)

FOREIGN PATENT DOCUMENTS

CN          102546895 A      7/2012
CN          203054730 U      7/2013
(Continued)

*Primary Examiner* — Long D Pham
(74) *Attorney, Agent, or Firm* — Rimon PC

(57) ABSTRACT

This application provides a signal transmission method and a related device. According to the signal transmission method, when two contact points on an electronic device are respectively in contact with two contact points on a keyboard, the electronic device may transmit a power signal and a GND signal to the keyboard through the contact points that are in contact with each other, that is, the electronic device may supply power to the keyboard. In addition, when a user presses a key on the keyboard to perform input, the keyboard may transmit key position information to the electronic device through a contact point that is in contact with the electronic device. In this signal transmission method, no Bluetooth chip needs to be built into the electronic device and the keyboard, reducing device costs.

16 Claims, 9 Drawing Sheets

(58) Field of Classification Search
USPC .......................................................... 345/168
See application file for complete search history.

(56) References Cited

U.S. PATENT DOCUMENTS

| | | | |
|---|---|---|---|
| 2013/0223659 A1* | 8/2013 | Zhen | ........................ H04R 5/04 |
| | | | 381/309 |
| 2015/0355877 A1 | 12/2015 | Kim | |
| 2018/0026461 A1 | 1/2018 | Rich et al. | |
| 2018/0364769 A1 | 12/2018 | Esmaeili et al. | |
| 2019/0138483 A1 | 5/2019 | Burks et al. | |
| 2024/0103593 A1 | 3/2024 | Yeh et al. | |

FOREIGN PATENT DOCUMENTS

| | | | |
|---|---|---|---|
| CN | 104850175 | A | 8/2015 |
| CN | 206162256 | U | 5/2017 |
| CN | 109154844 | A | 1/2019 |
| CN | 208588990 | U | 3/2019 |
| CN | 211930841 | U | 11/2020 |
| CN | 113949755 | A | 1/2022 |
| CN | 215835549 | U | 2/2022 |
| CN | 216748615 | U | 6/2022 |
| CN | 115295343 | A | 11/2022 |
| EP | 1519495 | B1 | 11/2010 |
| JP | 2005032207 | A | 2/2005 |
| TW | M446407 | U | 2/2013 |
| WO | 2016022599 | A2 | 2/2016 |
| WO | 2022186891 | A1 | 9/2022 |

* cited by examiner

SIGNAL TRANSMISSION BETWEEN ELECTRONIC DEVICE AND KEYBOARD USING HIGH/LOW PASS FILTERS

CROSS-REFERENCE TO RELATED APPLICATIONS

This application is a National Stage of International Application No. PCT/CN2023/117670, filed on Sep. 8, 2023, which claims priority to Chinese Patent Application No. 202211161307.0, filed on Sep. 23, 2022, both of which are hereby incorporated by reference in their entireties.

TECHNICAL FIELD

This application relates to the field of signal transmission, and in particular, to a signal transmission method and a related device.

BACKGROUND

Currently, terminal devices such as a mobile phone and a tablet computer are developing more rapidly. With continuous development of the terminal devices, a user requirement continuously changes, and a final basic communication requirement gradually develops into a communication and entertainment requirement in a plurality of dimensions such as visual, auditory, and tactile sensations. For example, a user needs to better meet an input requirement of the user by using an externally connected keyboard (namely, an external keyboard) based on these terminal devices. If input in the terminal device needs to be implemented by using the external keyboard, signal transmission needs to be performed between the terminal device and the external keyboard. Signal transmission usually may include two transmission manners: wireless transmission and wired transmission. A wireless communication chip usually needs to be built into the terminal device and the keyboard to implement wireless transmission. Costs are high, power consumption is high, and an unstable connection may be caused. A layout design problem of contact points on the terminal device and the keyboard usually needs to be considered to implement wired transmission.

Therefore, when both costs and power consumption are reduced, stability is ensured, and complexity of layout design of the contact points on the terminal device and the keyboard is reduced, how to implement signal transmission between the terminal device and the keyboard is an urgent problem to be resolved currently.

SUMMARY

This application provides a signal transmission method and a related device. According to the signal transmission method, when two contact points on an electronic device are respectively in contact with two contact points on a keyboard, the electronic device may transmit a power signal and a GND signal to the keyboard through the contact points that are in contact with each other, to supply power to the keyboard. In addition, the keyboard may transmit key position information to the electronic device through the contact points that are in contact with each other. In this signal transmission method, no Bluetooth chip needs to be built into the electronic device and the keyboard, reducing device costs. In addition, this signal transmission method belongs to wired transmission, is more stable than a wireless transmission manner such as Bluetooth transmission, and uses fewer contact points. This reduces complexity of layout design of the contact points on the electronic device and the keyboard, and alleviates a dirty problem caused by exposure of the contact points.

According to a first aspect, this application provides a signal transmission method. The method may be applied to an electronic device in which a first low-pass filter, a second low-pass filter, a first high-pass filter, a second high-pass filter, a first contact point, and a second contact point are disposed. Each of the first low-pass filter and the first high-pass filter is connected to the first contact point, and each of the second low-pass filter and the second high-pass filter is connected to the second contact point. The second contact point is configured to be in contact with a third contact point on a keyboard, and the first contact point is configured to be in contact with a fourth contact point on the keyboard. The method may include: The electronic device may transmit a power signal to the first contact point through the first low-pass filter, and may further transmit a GND signal to the second contact point through the second low-pass filter. The method may further include: The electronic device may receive key position information transmitted by the keyboard to the first contact point, and may further process, through the first high-pass filter, the key position information transmitted to the first contact point; the electronic device may receive key position information transmitted by the keyboard to the second contact point, and may further process, through the second high-pass filter, the key position information transmitted to the second contact point; or the electronic device may receive key position information transmitted by the keyboard to the first contact point, may process, through the first high-pass filter, the key position information transmitted to the first contact point, may receive key position information transmitted by the keyboard to the second contact point, and may further process, through the second high-pass filter, the key position information transmitted to the second contact point.

In the solution provided in this application, the first contact point on the electronic device may be in contact with the fourth contact point on the keyboard, and the second contact point on the electronic device may be in contact with the third contact point on the keyboard. When the two pairs of contact points (namely, the first contact point and the fourth contact point, and the second contact point and the third contact point) are in contact with each other, the electronic device may transmit the power signal and the GND signal to the keyboard, to supply power to the keyboard. Specifically, the electronic device may transmit the power signal to the first contact point through the first low-pass filter, and then to the fourth contact point; and the electronic device may further transmit the GND signal to the second contact point through the second low-pass filter, and then to the third contact point. In addition, when the two pairs of contact points (namely, the first contact point and the fourth contact point, and the second contact point and the third contact point) are in contact with each other, the keyboard may further transmit the key position information to the keyboard. Specifically, the keyboard may transmit the key position information to the fourth contact point through a fourth high-pass filter, and then to the first contact point; and the keyboard may further transmit the key position information to the third contact point through a third high-pass filter, and then to the second contact point. It may be understood that the electronic device may transmit the power signal and the key position information through the first contact point and the fourth contact point that are in contact with each other, separate the power signal through the first low-pass filter and a fourth low-pass filter, and separate the key position information through the first high-pass filter and the fourth high-pass filter. Similarly, the electronic device may transmit the GND signal and the key position information through the second contact point and the third contact point that are in contact with each other, separate the GND signal through the second low-pass filter and a third low-pass filter, and separate the key position information through the second high-pass filter and the third high-pass filter.

In this method, no Bluetooth chip needs to be built into the electronic device and the keyboard. This reduces device costs and is more stable than a wireless transmission manner such as Bluetooth transmission. Compared with the low-pass filter and the high-pass filter, the contact point has a larger size, and occupies larger space on a circuit board. In addition, the contact point on the electronic device corresponds to the contact point on the keyboard. That is, after a position of the contact point on the electronic device is determined, a position of the contact point on the keyboard is correspondingly limited, and the contact point cannot be deployed at any position on the keyboard. This means that a larger quantity of contact points on the electronic device and the keyboard indicates higher complexity of layout design. In this method, fewer contact points are used to implement communication between the electronic device and the keyboard. This reduces complexity of layout design of the contact points on the electronic device and the keyboard. In addition, because the contact points are exposed outside the electronic device and the keyboard, some dirty problems exist. In this method, fewer contact points are used. This alleviates the dirty problem, and reduces a burden of cleaning the contact point by a user.

It may be understood that after being transmitted to the fourth contact point on the keyboard, the power signal may continue to be transmitted to a processor in the keyboard through the fourth low-pass filter. After being transmitted to the third contact point on the keyboard, the GND signal may continue to be transmitted to the processor in the keyboard through the third low-pass filter.

It may be understood that after being transmitted to the first contact point on the electronic device, the key position information may continue to be transmitted to a processor in the electronic device through the first low-pass filter. Similarly, after being transmitted to the second contact point on the electronic device, the key position information may continue to be transmitted to the processor in the electronic device through the second low-pass filter. It may be understood that the processor in the electronic device processes the key position information to obtain content, namely, input content of the user, represented by a key pressed by the user, and transmits the input content to a display for display.

It may be understood that the electronic device may be an electronic device 100 described below, and the keyboard may be a keyboard 200 described below.

It may be understood that the first contact point may be a contact point 1 described below, the second contact point may be a contact point 2 described below, the third contact point may be a contact point 3 described below, the fourth contact point may be a contact point 4 described below, the first low-pass filter may be a low-pass filter 1 described below, the second low-pass filter may be a low-pass filter 2 described below, the first high-pass filter may be a high-pass filter 1 described below, and the second high-pass filter may be a high-pass filter 2 described below.

In some embodiments of this application, the first contact point may be a contact point 101, and the second contact point may be a contact point 102. In some embodiments of this application, the first contact point may be a contact point 103, and the second contact point may be a contact point 104. In some embodiments of this application, the first contact point may be a contact point 105, and the second contact point may be a contact point 106. In some embodiments of this application, the first contact point may be a contact point 107, and the second contact point may be a contact point 108.

In some embodiments of this application, the third contact point may be a contact point 203, and the fourth contact point may be a contact point 204. In some embodiments of this application, the third contact point may be a contact point 205, and the fourth contact point may be a contact point 206.

It may be understood that the key position information is used to indicate a position of a key pressed on the keyboard. Alternatively, it may be understood that the key position information includes a position code of a key pressed on the keyboard.

In some embodiments of this application, the key position information may include several position codes. That is, the keyboard does not need to transmit a position code to the electronic device after obtaining the position code, but instead obtains a plurality of position codes, packages the position codes, and then sends the position codes to the electronic device. In this manner, transmission efficiency can be improved.

In some embodiments of this application, the key position information may be a signal 1 and/or a signal 2 described below. It may be understood that when the key position information is transmitted through the first contact point and the fourth contact point, the key position information may be the signal 1 described below; when the key position information is transmitted through the second contact point and the third contact point, the key position information may be the signal 2 described below; or when the key position information is transmitted through the first contact point, the second contact point, the third contact point, and the fourth contact point, the key position information may include the signal 1 and the signal 2 described below.

With reference to the first aspect, in a possible implementation, the first low-pass filter includes a bead not less than 100 ohms, the second low-pass filter includes a bead not less than 100 ohms, the first high-pass filter includes at least one capacitor and at least one inductor, and the second high-pass filter includes at least one capacitor and at least one inductor.

In the solution provided in this application, each of the first low-pass filter and the second low-pass filter may include a bead not less than 100 ohms, to distinguish between the power signal, the GND signal, and another high-frequency signal. The first high-pass filter may include at least one capacitor and at least one inductor, and the second high-pass filter may also include at least one capacitor and at least one inductor. Resistance values of the capacitor and the inductor may be determined based on a frequency of the key position information. For details, refer to an example provided below.

In some embodiments of this application, a capacitor and an inductor are connected in series to form the first high-pass filter. For example, as shown in FIG. 14, the first high-pass filter may include a capacitor C2 and an inductor L3 that are connected in series. It may be understood that for parameters of the capacitor C2 and the inductor L3, refer to the following description, or parameters may be separately set based on an actual situation. This is not limited in this application. Similarly, a capacitor and an inductor may be connected in series to form the second high-pass filter.

With reference to the first aspect, in a possible implementation, the key position information may be a USB signal.

In the solution provided in this application, the key position information may be designed as a USB signal. In this case, for transmission of the key position information, refer to a USB communication protocol. It may be understood that when the key position information is a USB signal, the keyboard may transmit the key position information through the third contact point and the fourth contact point. In this transmission manner, adaptation to some processors is implemented, and no further design is required for the processor in the electronic device.

In some embodiments of this application, when the key information is a USB signal, the first low-pass filter may include a bead not less than 100 ohms, the second low-pass filter may include a bead not less than 100 ohms, the first high-pass filter may include a capacitor and an inductor that are connected in series, and the first high-pass filter may also include a capacitor and an inductor that are connected in series.

In some embodiments of this application, the keyboard may transmit the key position information only through the third contact point or the fourth contact point.

With reference to the first aspect, in a possible implementation, before the electronic device may receive the key position information transmitted by the keyboard to the first contact point, and may further process, through the first high-pass filter, the key position information transmitted to the first contact point; the electronic device may receive the key position information transmitted by the keyboard to the second contact point, and may further process, through the second high-pass filter, the key position information transmitted to the second contact point; or the electronic device may receive the key position information transmitted by the keyboard to the first contact point, may process, through the first high-pass filter, the key position information transmitted to the first contact point, may receive the key position information transmitted by the keyboard to the second contact point, and may further process, through the second high-pass filter, the key position information transmitted to the second contact point, the method may further include: The electronic device may send first information processed by the first high-pass filter to the keyboard through the first contact point; or the electronic device may send first information processed by the second high-pass filter to the keyboard through the second contact point. The first information is used to request the keyboard to establish a communication connection. The method may further include: The electronic device may receive, through the first contact point, second information sent by the keyboard, and may further process the second information through the first high-pass filter; or the electronic device may receive second information through the second contact point, and may further process the second information through the second high-pass filter. The second information is used to indicate that the keyboard establishes a communication connection to the electronic device.

It may be understood that the second information is used to indicate that the keyboard agrees to establish a communication connection to the electronic device.

In some embodiments of this application, the first information may be a signal 1 or a signal 2 described below.

In some embodiments of this application, the second signal may be a signal 1 or a signal 2 described below.

In some embodiments of this application, the second signal may be an ACK signal.

With reference to the first aspect, in a possible implementation, the key position information may be an I2C signal.

In the solution provided in this application, the key position information may be designed as an I2C signal. In this case, for transmission of the key position information, refer to an I2C communication protocol. It may be understood that when the key position information is an I2C signal, the keyboard may transmit the key position information through the third contact point and the fourth contact point. In this transmission manner, adaptation to some processors is implemented, and no further design is required for the processor in the electronic device.

With reference to the first aspect, in a possible implementation, the first low-pass filter may include at least two inductors and at least one capacitor, the second low-pass filter may include at least two inductors and at least one capacitor, the first high-pass filter may include at least one capacitor and at least one inductor, and the second high-pass filter may include at least one capacitor and at least one inductor.

In some embodiments of this application, when the key position information is an I2C signal, the first low-pass filter may include two inductors and one capacitor. One inductor is connected in series to the capacitor, and the other inductor is connected in parallel to the capacitor. For example, as shown in FIG. 13, the first low-pass filter may include a capacitor C1 and an inductor L1 that are connected in parallel, and an inductor L2 that is connected in series to the capacitor C1 and the inductor L1. It may be understood that for parameters of the capacitor C1, the inductor L1, and the inductor L2, refer to the following description, or parameters may be separately set based on an actual situation. This is not limited in this application. Similarly, the second low-pass filter may include two inductors and one capacitor. One inductor is connected in series to the capacitor, and the other inductor is connected in parallel to the capacitor.

Certainly, a quantity of capacitors and inductors included in each of the first low-pass filter and the second low-pass filter, and a connection relationship between the capacitor and the inductor are not limited to the foregoing examples. This is not limited in this application.

According to a second aspect, this application provides a signal transmission method. The method may be applied to a keyboard in which a third low-pass filter, a fourth low-pass filter, a third high-pass filter, a fourth high-pass filter, a third contact point, and a fourth contact point are disposed. Each of the third low-pass filter and the third high-pass filter is connected to the third contact point, and each of the fourth low-pass filter and the fourth high-pass filter is connected to the fourth contact point. The fourth contact point is configured to be in contact with a first contact point on an electronic device, and the third contact point is configured to be in contact with a second contact point on the electronic device. The method may include: The keyboard may receive a power signal transmitted by the electronic device to the fourth contact point, and may further process the power signal through the fourth low-pass filter; or the keyboard may receive a GND signal transmitted by the electronic device to the third contact point, and may further process the GND signal through the third low-pass filter. The method may further include: The keyboard may transmit key position information processed by the third high-pass filter to the electronic device through the third contact point; the keyboard may transmit key position information processed by the fourth high-pass filter to the electronic device through the fourth contact point; or the keyboard may transmit key position information processed by the third high-pass filter to the electronic device through the third contact point, and may further transmit key position information processed by the fourth high-pass filter to the electronic device through the fourth contact point.

In this method, no Bluetooth chip needs to be built into the electronic device and the keyboard. This reduces device costs and is more stable than a wireless transmission manner such as Bluetooth transmission. In addition, fewer contact points are used to implement communication between the electronic device and the keyboard. This reduces complexity of layout design of the contact points on the electronic device and the keyboard. In addition, because the contact points are exposed outside the electronic device and the keyboard, some dirty problems exist. In this method, fewer contact points are used. This alleviates the dirty problem, and reduces a burden of cleaning the contact point by a user.

It may be understood that the third low-pass filter may be a low-pass filter 3 described below, the fourth low-pass filter may be a low-pass filter 4 described below, the third high-pass filter may be a high-pass filter 3 described below, and the fourth high-pass filter may be a high-pass filter 4 described below.

With reference to the second aspect, in a possible implementation, the third low-pass filter may include a bead not less than 100 ohms, the fourth low-pass filter may include a bead not less than 100 ohms, the third high-pass filter may include at least one capacitor and at least one inductor, and the fourth high-pass filter may include at least one capacitor and at least one inductor.

With reference to the second aspect, in a possible implementation, the key position information is a USB signal.

With reference to the second aspect, in a possible implementation, before the keyboard may transmit the key position information processed by the third high-pass filter to the electronic device through the third contact point; the keyboard may transmit the key position information processed by the fourth high-pass filter to the electronic device through the fourth contact point; or the keyboard may transmit the key position information processed by the third high-pass filter to the electronic device through the third contact point, and may further transmit the key position information processed by the fourth high-pass filter to the electronic device through the fourth contact point, the method may further include: The keyboard may receive, through the third contact point, first information sent by the electronic device, and may further process the first information through the third high-pass filter; or the keyboard may receive first information through the fourth contact point, and may further process the first information through the fourth high-pass filter. The first information is used to request the keyboard to establish a communication connection. The method may further include: The keyboard may send second information processed by the third high-pass filter to the electronic device through the third contact point; or the keyboard may send second information processed by the fourth high-pass filter to the electronic device through the third contact point. The second information is used to indicate that the keyboard establishes a communication connection to the electronic device.

With reference to the second aspect, in a possible implementation, the key position information may be an I2C signal.

With reference to the second aspect, in a possible implementation, the third low-pass filter may include at least two inductors and at least one capacitor, the fourth low-pass filter may include at least two inductors and at least one capacitor, the first high-pass filter may include at least one capacitor and at least one inductor, and the second high-pass filter may include at least one capacitor and at least one inductor.

According to a third aspect, this application provides an electronic device. The electronic device may include a first low-pass filter, a second low-pass filter, a first high-pass filter, a second high-pass filter, a first contact point, and a second contact point. Each of the first low-pass filter and the first high-pass filter is connected to the first contact point, and each of the second low-pass filter and the second high-pass filter is connected to the second contact point. The second contact point may be configured to be in contact with a third contact point on a keyboard. The first contact point may be configured to be in contact with a fourth contact point on the keyboard. The first low-pass filter may be configured to transmit a power signal to the first contact point. The second low-pass filter may be configured to transmit a GND signal to the second contact point. The first high-pass filter may be configured to process key position information transmitted by the keyboard to the first contact point; the second high-pass filter may be configured to process key position information transmitted by the keyboard to the second contact point; or the first high-pass filter may be configured to process key position information transmitted by the keyboard to the first contact point, and the second high-pass filter may be configured to process key position information transmitted by the keyboard to the second contact point.

With reference to the third aspect, in a possible implementation, the first low-pass filter includes a bead not less than 100 ohms, the second low-pass filter includes a bead not less than 100 ohms, the first high-pass filter includes at least one capacitor and at least one inductor, and the second high-pass filter includes at least one capacitor and at least one inductor.

With reference to the third aspect, in a possible implementation, the first low-pass filter may include at least two inductors and at least one capacitor, the second low-pass filter may include at least two inductors and at least one capacitor, the first high-pass filter may include at least one capacitor and at least one inductor, and the second high-pass filter may include at least one capacitor and at least one inductor.

With reference to the third aspect, in a possible implementation, the first high-pass filter may be further configured to transmit first information to the first contact point; or the second high-pass filter may be further configured to transmit first information to the second contact point. The first information is used to request the keyboard to establish a communication connection. The first high-pass filter may be further configured to process second information transmitted by the keyboard to the first contact point; or the second high-pass filter may be further configured to process second information transmitted by the keyboard to the second contact point. The second information is used to indicate that the keyboard establishes a communication connection to the electronic device.

According to a fourth aspect, this application provides a keyboard. The keyboard may include a third low-pass filter, a fourth low-pass filter, a third high-pass filter, a fourth high-pass filter, a third contact point, and a fourth contact point. Each of the third low-pass filter and the third high-pass filter is connected to the third contact point, and each of the fourth low-pass filter and the fourth high-pass filter is connected to the fourth contact point. The fourth contact point may be configured to be in contact with a first contact point on an electronic device. The third contact point may be configured to be in contact with a second contact point on the electronic device. The third low-pass filter may be configured to process a GND signal transmitted by the electronic device to the third contact point. The fourth low-pass filter may be configured to process a power signal transmitted by the electronic device to the fourth contact point. The third high-pass filter may be configured to transmit key position information to the third contact point; the fourth high-pass filter may be configured to transmit key position information to the fourth contact point; or the third high-pass filter may be configured to transmit key position information to the third contact point, and the fourth high-pass filter may be configured to transmit key position information to the fourth contact point.

With reference to the fourth aspect, in a possible implementation, the third low-pass filter may include a bead not less than 100 ohms, the fourth low-pass filter may include a bead not less than 100 ohms, the third high-pass filter may include at least one capacitor and at least one inductor, and the fourth high-pass filter may include at least one capacitor and at least one inductor.

With reference to the fourth aspect, in a possible implementation, the third low-pass filter may include at least two inductors and at least one capacitor, the fourth low-pass filter may include at least two inductors and at least one capacitor, the first high-pass filter may include at least one capacitor and at least one inductor, and the second high-pass filter may include at least one capacitor and at least one inductor.

With reference to the fourth aspect, in a possible implementation, the third high-pass filter may be further configured to process first information transmitted by the electronic device to the third contact point; or the fourth high-pass filter may be further configured to process first information transmitted by the electronic device to the fourth contact point. The first information may be used to request the keyboard to establish a communication connection. The third high-pass filter may be further configured to transmit second information to the third contact point; or the fourth high-pass filter may be further configured to transmit second information to the fourth contact point. The second information is used to indicate that the keyboard establishes a communication connection to the electronic device.

According to a fifth aspect, this application provides a computer storage medium, including computer instructions. When the computer instructions are run on an electronic device, the electronic device is enabled to perform any possible implementation of the first aspect.

According to a sixth aspect, this application provides a computer storage medium, including computer instructions. When the computer instructions are run on a keyboard, the keyboard is enabled to perform any possible implementation of the second aspect.

According to a seventh aspect, an embodiment of this application provides a chip. The chip may be applied to an electronic device, and the chip includes one or more processors. The processor is configured to invoke computer instructions, to enable the electronic device to perform any possible implementation of the first aspect.

According to an eighth aspect, an embodiment of this application provides a chip. The chip may be applied to a keyboard, and the chip includes one or more processors. The processor is configured to invoke computer instructions, to enable the keyboard to perform any possible implementation of the second aspect.

It may be understood that all of the electronic device provided in the third aspect, the computer storage medium provided in the fifth aspect, and the chip provided in the seventh aspect are configured to perform any possible implementation of the first aspect. Therefore, for beneficial effects that can be achieved by the electronic device, the computer storage medium, and the chip, refer to the beneficial effects of any possible implementation of the first aspect. Details are not described herein. It should be noted that for beneficial effects of any possible implementation of the second aspect, refer to the beneficial effects of any possible implementation of the first aspect. Correspondingly, all of the keyboard provided in the fourth aspect, the computer storage medium provided in the sixth aspect, and the chip provided in the eighth aspect are configured to perform any possible implementation of the second aspect. Therefore, for beneficial effects that can be achieved by the keyboard, the computer storage medium, and the chip, refer to the beneficial effects of any possible implementation of the first aspect. Details are not described herein.

DESCRIPTION OF EMBODIMENTS

Figure 1:
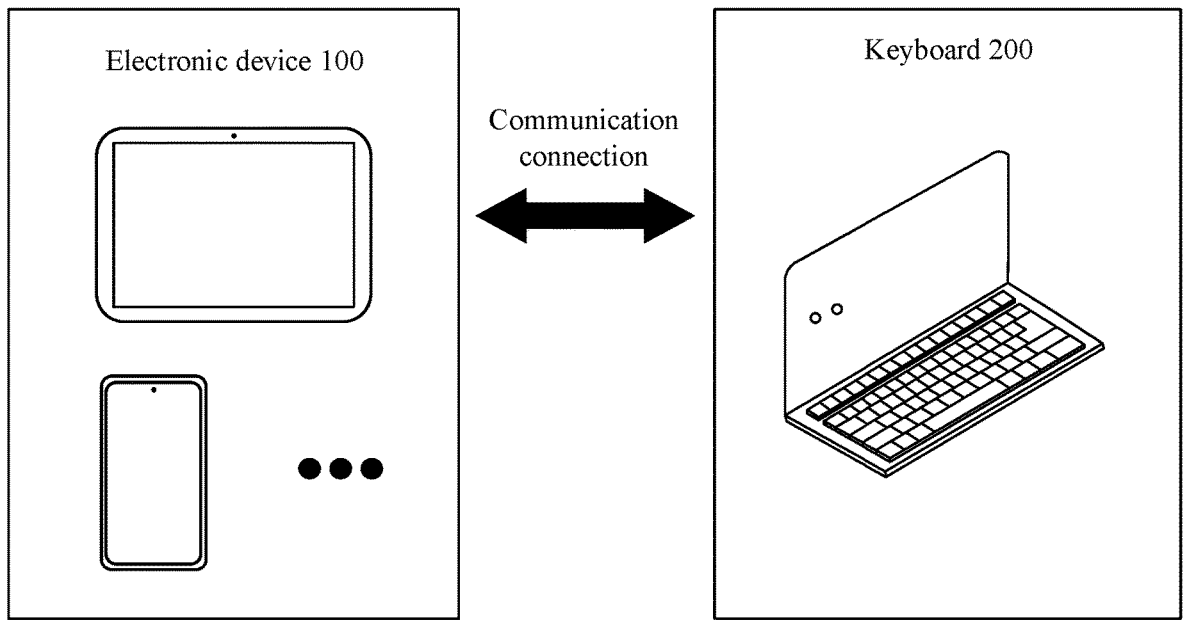
FIG. 1 is a schematic diagram of a signal transmission scenario according to an embodiment of this application.

The following clearly describes technical solutions in embodiments of this application with reference to the accompanying drawings in the embodiments of this application. In the description of the embodiments of this application, unless otherwise specified, "/" means "or". For example, A/B may represent A or B. In this specification, "and/or" is merely an association relationship for describing associated objects, and indicates that three relationships may exist. For example, A and/or B may indicate the following three cases: Only A exists, both A and B exist, and only B exists. In addition, in the description of the embodiments of this application, "a plurality of" means two or more.

It should be understood that the terms "first", "second", and the like in the specification, claims, and accompanying drawings of this application are used to distinguish between different objects, and are not used to describe a specific sequence. In addition, the terms "include" and "have" and any variations thereof are intended to cover a non-exclusive inclusion. For example, a process, method, system, product, or device that includes a series of steps or units is not limited to a listed step or unit, but optionally further includes an unlisted step or unit, or optionally further includes another step or unit inherent to the process, method, product, or device.

An "embodiment" in this application means that a specific feature, structure, or characteristic described with reference to the embodiment may be included in at least one embodiment of this application. The term appearing at various positions in the specification does not necessarily refer to a same embodiment, or an independent or alternative embodiment mutually exclusive with another embodiment. A person skilled in the art explicitly and implicitly understands that the described embodiments in this application may be combined with another embodiment.

Currently, when using some terminal devices (for example, a tablet computer), a user needs to use an external keyboard to perform input.

In a possible implementation, when a wireless communication chip is built into the tablet computer and the keyboard, communication may be performed between the tablet computer and the keyboard in a wireless connection manner, that is, signal transmission is performed in a wireless transmission manner. In this signal transmission manner, costs are high, power consumption is high, and unstable signal transmission may be caused due to an unstable connection.

In a possible implementation, when a contact point on the tablet computer is in a contact state with a contact point on the keyboard, communication may be performed between the tablet computer and the keyboard in a wired connection manner, that is, signal transmission is performed in a wired transmission manner. Specifically, in the wired connection manner, there are at least three contact points on the tablet computer, and the three contact points may be respectively understood as a power supply end, a ground end, and a communication end. The power supply end is configured to transmit a power signal, the ground end is configured to transmit a GND signal, and the communication end is configured to transmit communication data between the tablet computer and the keyboard. It may be understood that correspondingly, there are at least three contact points on the keyboard. The contact points on the tablet computer are respectively in contact with the contact points on the keyboard, to supply power to and implement communication with the keyboard. In this signal transmission manner, a relatively large quantity of contact points are required (one device needs at least three contact points). In addition, a larger quantity of contact points on the tablet computer and the keyboard indicates higher difficulty in design. In addition, because this signal transmission manner depends on the contact points on the tablet computer and the keyboard, it needs to be ensured that the contact points on the tablet computer and the keyboard are in good contact, to ensure a good connection between the tablet computer and the keyboard. However, because the contact points on the tablet computer and the keyboard are exposed, a problem such as dirt and wear is more likely to occur when a quantity of contact points is larger. This is more detrimental to the connection between the tablet computer and the keyboard.

This application provides a signal transmission method and a related device. According to the signal transmission method, when two contact points on an electronic device 100 are respectively in contact with two contact points on a keyboard 200, the electronic device 100 may transmit a power signal and a GND signal to the keyboard 200 through the contact points that are in contact with each other, that is, the electronic device 100 may supply power to the keyboard 200. In addition, when a user presses a key on the keyboard 200 to perform input, the keyboard 200 may transmit key position information to the electronic device 100 through the contact points that are in contact with each other. In this signal transmission manner, no Bluetooth chip needs to be built into the electronic device 100 and the keyboard 200. This reduces device costs. In addition, this signal transmission manner is a wired transmission manner, is more stable than Bluetooth transmission, and uses fewer contact points. This reduces complexity of layout design of the contact points on the electronic device and the keyboard.

FIG. 1 is a schematic diagram of a signal transmission scenario according to an embodiment of this application.

As shown in FIG. 1, a communication connection is established between an electronic device 100 and a keyboard 200. Signal transmission may be performed between the electronic device 100 and the keyboard 200. Specifically, the electronic device 100 may include two contact points. Correspondingly, the keyboard 200 may also include two contact points. The two contact points on the electronic device 100 are respectively in contact with the two contact points on the keyboard 200, and the electronic device 100 and the keyboard 200 may transmit a signal through these contact points that are in contact with each other. The electronic device 100 may include an electronic device such as a mobile phone or a tablet computer. A specific type of the electronic device 100 is not limited in this application.

In some embodiments of this application, the two contact points included on the electronic device 100 are on a back surface of the electronic device 100. In this application, when a user uses the electronic device 100, a surface that is of the electronic device 100 and that faces the user is a front surface, and a surface that is of the electronic device 100 and that faces away from the user is the back surface. It may be understood that a surface on which a display of the electronic device 100 is located is the front surface of the electronic device 100, and a surface that is of the electronic device 100 and that faces away from the display is the back surface of the electronic device 100. It may be further understood that when the electronic device 100 includes a front-facing camera and a rear-facing camera, a surface on which the front-facing camera in the electronic device 100 is located is the front surface of the electronic device 100, and a surface on which the rear-facing camera in the electronic device 100 is located is the back surface of the electronic device 100.

Figure 2A:
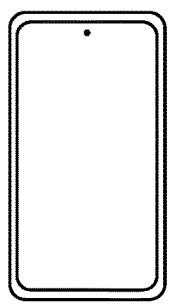
FIG. 2A is a front view of an electronic device 100 according to an embodiment of this application.
Figure 2B:
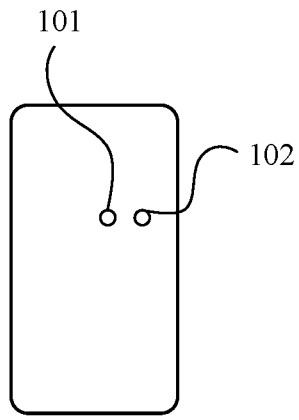
FIG. 2B is a rear view of an electronic device 100 according to an embodiment of this application.

For example, the electronic device 100 may be a mobile phone. FIG. 2A is a front view of an electronic device 100 according to an embodiment of this application. FIG. 2B is a rear view of an electronic device 100 according to an embodiment of this application. As shown in FIG. 2A and FIG. 2B, two contact points, namely, a contact point 101 and a contact point 102, are disposed on a back surface of the mobile phone. That is, the contact point 101 and the contact point 102 are disposed on the back surface of the electronic device 100.

Figure 3A:
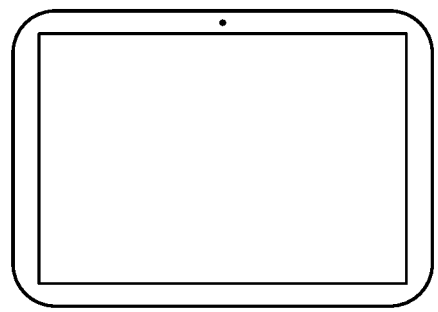
FIG. 3A is another front view of an electronic device 100 according to an embodiment of this application.
Figure 3B:
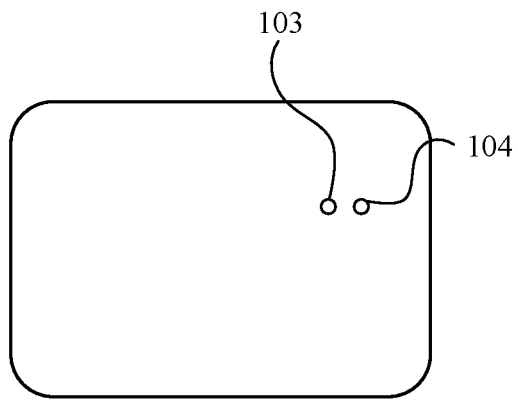
FIG. 3B is another rear view of an electronic device 100 according to an embodiment of this application.

For example, the electronic device 100 may be a tablet computer. FIG. 3A is another front view of an electronic device 100 according to an embodiment of this application. FIG. 3B is another rear view of an electronic device 100 according to an embodiment of this application. As shown in FIG. 3A and FIG. 3B, two contact points, namely, a contact point 103 and a contact point 104, are disposed on a back surface of the tablet computer. That is, the contact point 103 and the contact point 104 are disposed on the back surface of the electronic device 100.

Figure 4:
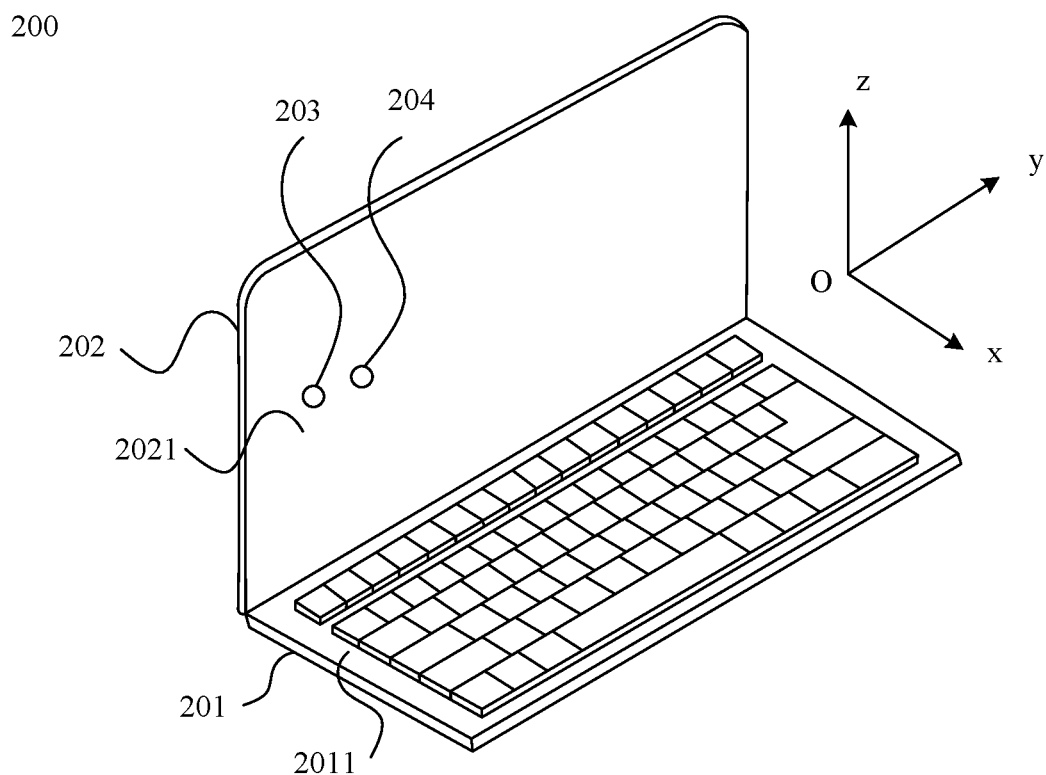
FIG. 4 is a schematic diagram of a structure of a keyboard 200 according to an embodiment of this application.

In some embodiments of this application, as shown in FIG. 4, the keyboard 200 may include a key part 201 and a fastening part 202. The fastening part 202 may be snap-fitted with the key part 201. The key part 201 may include several keys, and may further include a touchpad. The fastening part 202 is configured to support and fasten the electronic device 100. The key part 201 has a first surface 2011, and the fastening part 202 has a second surface 2021. When the fastening part 202 is snap-fitted with the key part 201, the first surface 2011 and the second surface 2021 are disposed opposite to each other. A contact point 203 and a contact point 204 are disposed on the second surface 2021 of the fastening part 202. In a space rectangular coordinate system O-xyz shown in FIG. 4, an x-axis direction in the coordinate system is a width direction of the key part 201, a y-axis direction is a length direction of the key part 201, and a z-axis direction is a thickness direction of the key part 201. It may be understood that the first surface 2011 is parallel to an xOy plane.

In some embodiments of this application, the keyboard 200 may further include a connection part. The fastening part 202 may be connected to the key part 201 through the connection part. In a possible implementation, the connection part may be a rotating part. For example, the connection part may be a damper shaft. In this case, the fastening part 202 may be rotatably connected to the key part 201 through the connection part. When the fastening part 202 rotates based on the connection part, an included angle between the second surface 2021 and the first surface 2011 changes correspondingly. According to the space rectangular coordinate system O-xyz shown in FIG. 4, the y-axis direction in the coordinate system is parallel to a rotation axis of the connection part.

Figure 5:
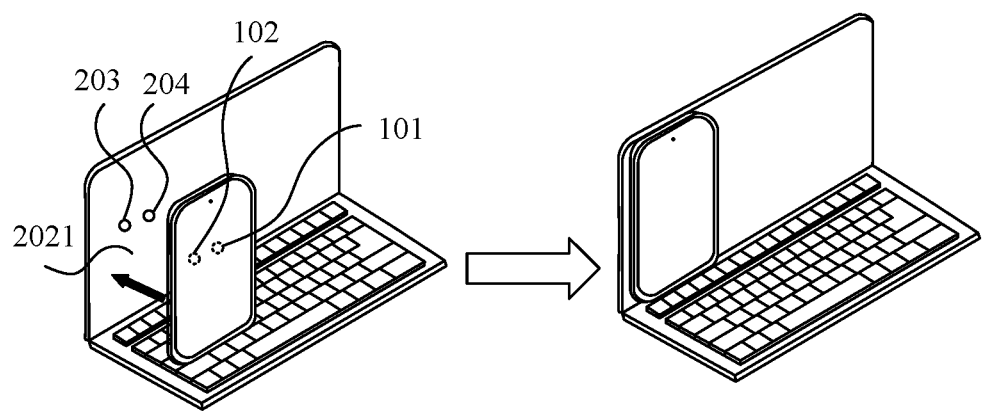
FIG. 5 is a schematic diagram of a connection between an electronic device 100 and a keyboard 200 according to an embodiment of this application.
Figure 6:
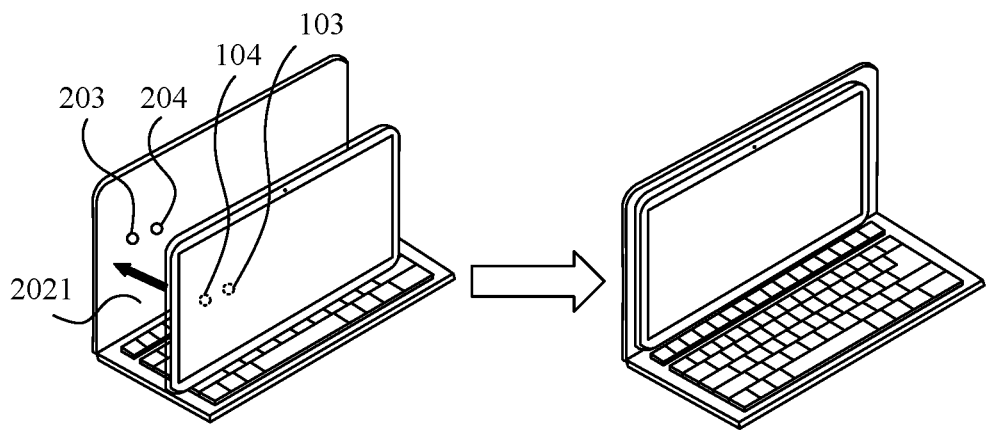
FIG. 6 is another schematic diagram of a connection between an electronic device 100 and a keyboard 200 according to an embodiment of this application.

Based on the foregoing content, when the user uses both the electronic device 100 and the keyboard 200, the electronic device 100 may be mounted on the keyboard 200. Specifically, the electronic device 100 may be mounted on the second surface 2021 of the fastening part 202. In some embodiments of this application, as shown in FIG. 5, the contact point 101 on the back surface of the electronic device 100 may be in contact with the contact point 204 on the second surface 2021, and the contact point 102 on the back surface of the electronic device 100 may be in contact with the contact point 203 on the second surface 2021. In some other embodiments of this application, as shown in FIG. 6, the contact point 104 on the back surface of the electronic device 100 may be in contact with the contact point 203 on the second surface 2021, and the contact point 103 on the back surface of the electronic device 100 may be in contact with the contact point 204 on the second surface 2021.

In some embodiments of this application, the two contact points included on the electronic device 100 are on a side surface of the electronic device 100. Alternatively, it may be understood that the two contact points included on the electronic device 100 are on a side edge of the electronic device 100. In this application, when a user uses the electronic device 100, a surface that is of the electronic device 100, that does not face the user, and that does not face away from the user is the side surface.

Figure 7:
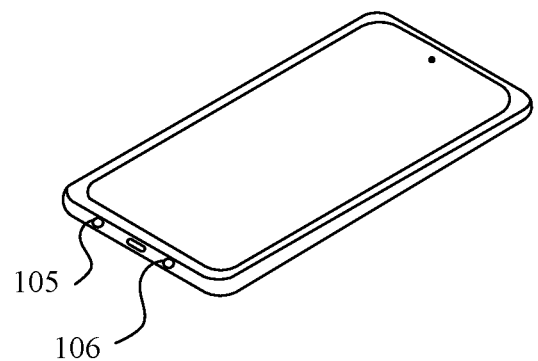
FIG. 7 is a schematic diagram of a structure of an electronic device 100 according to an embodiment of this application.

For example, the electronic device 100 may be a mobile phone. As shown in FIG. 7, two contact points, namely, a contact point 105 and a contact point 106, are disposed on a side edge on which a charging port in the mobile phone is located. That is, the contact point 105 and the contact point 106 are disposed on the side edge of the electronic device 100.

Figure 8:
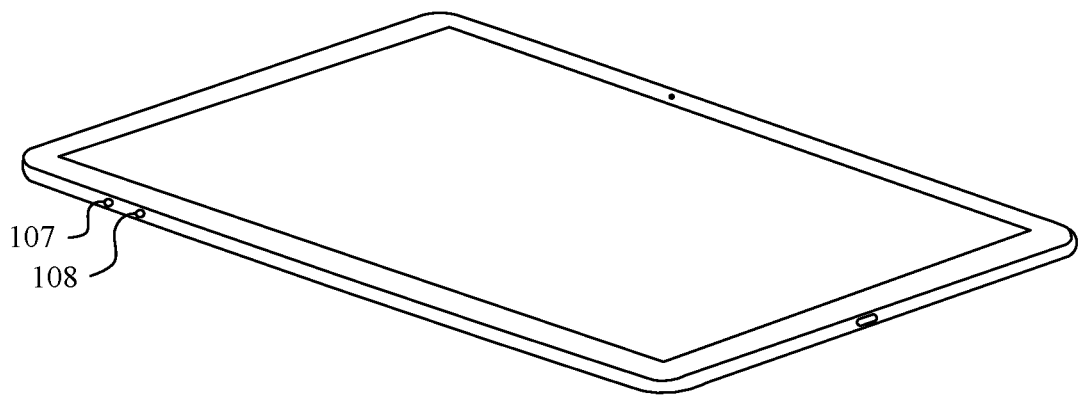
FIG. 8 is another schematic diagram of a structure of an electronic device 100 according to an embodiment of this application.

For example, the electronic device 100 may be a tablet computer. As shown in FIG. 8, two contact points, namely, a contact point 107 and a contact point 108, are disposed on a side edge on which a charging port in the mobile phone is located. That is, the contact point 107 and the contact point 108 are disposed on the side edge of the electronic device 100.

Figure 9:
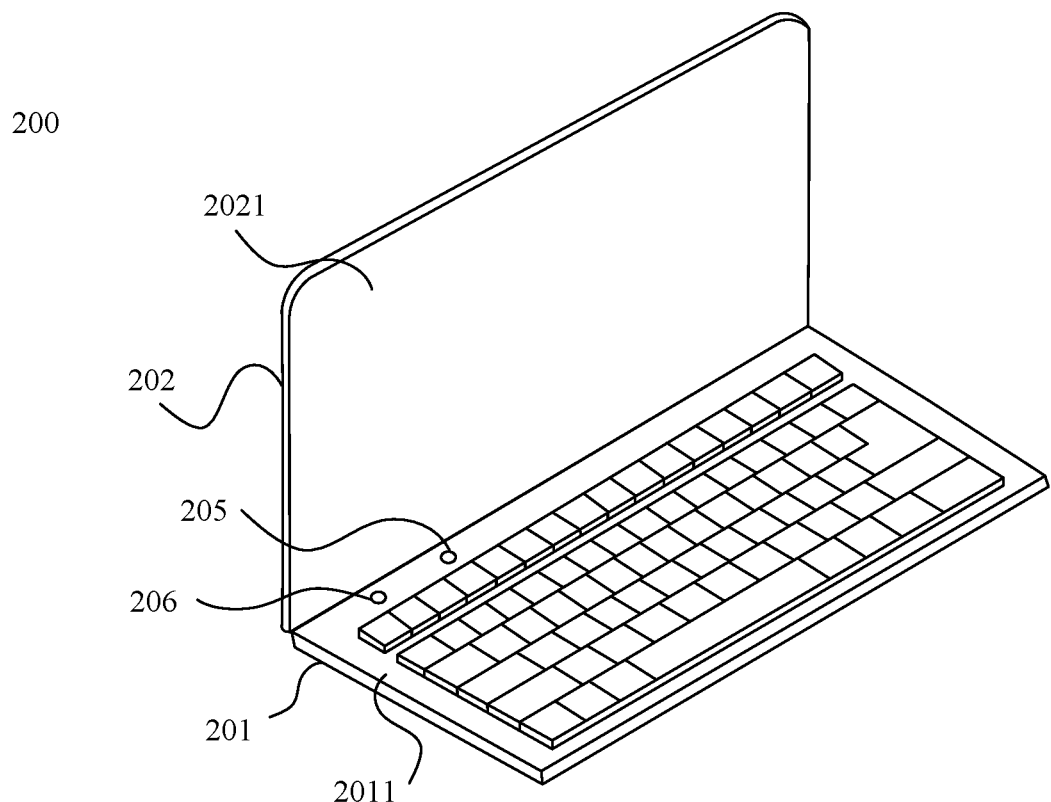
FIG. 9 is another schematic diagram of a structure of a keyboard 200 according to an embodiment of this application.

In some embodiments of this application, as shown in FIG. 9, the keyboard 200 may include a key part 201 and a fastening part 202. The key part 201 has a first surface 2011, and the fastening part 202 has a second surface 2021. A contact point 205 and a contact point 206 are disposed on the first surface 2011 of the key part 201. It may be understood that the keyboard 200 may further include a connection part. For related descriptions of the key part 201, the fastening part 202, and the connection part, refer to the foregoing description. Details are not described herein.

Figure 10:
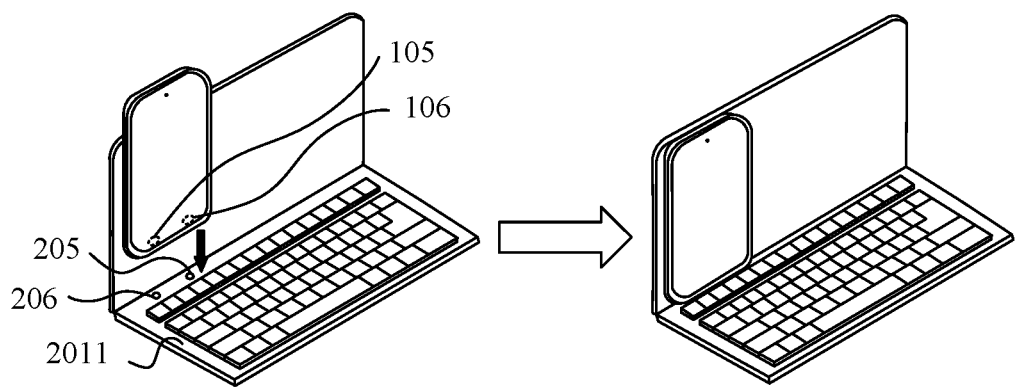
FIG. 10 is another schematic diagram of a connection between an electronic device 100 and a keyboard 200 according to an embodiment of this application.
Figure 11:
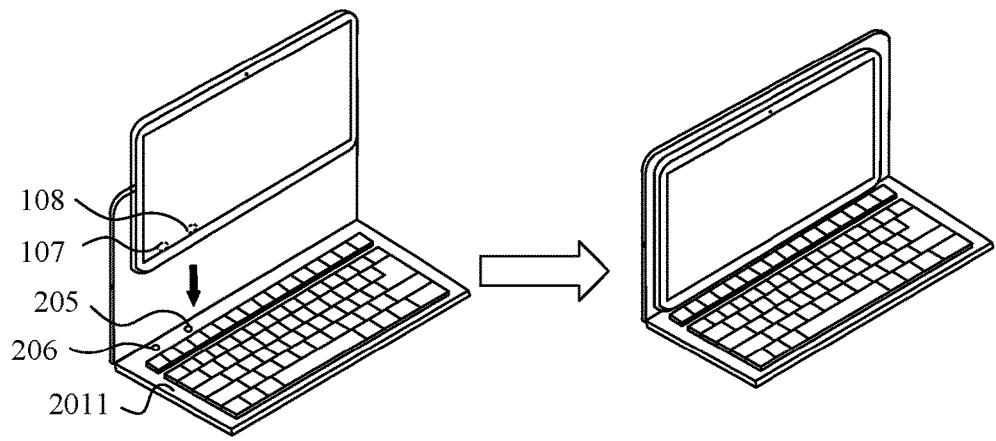
FIG. 11 is another schematic diagram of a connection between an electronic device 100 and a keyboard 200 according to an embodiment of this application.

Based on the foregoing content, when the user uses both the electronic device 100 and the keyboard 200, the electronic device 100 may be mounted on the keyboard 200. Specifically, the electronic device 100 may be mounted on the second surface 2021 of the fastening part 202. In some embodiments of this application, as shown in FIG. 10, the contact point 105 on the side edge of the electronic device may be in contact with the contact point 206 on the first surface 2011, and the contact point 106 on the side edge of the electronic device may be in contact with the contact point 205 on the first surface 2011. In some other embodiments of this application, as shown in FIG. 11, the contact point 107 on the side edge of the electronic device may be in contact with the contact point 206 on the first surface 2011, and the contact point 108 on the side edge of the electronic device may be in contact with the contact point 205 on the first surface 2011.

In some embodiments of this application, the two contact points on the electronic device 100 and the two contact points on the keyboard 200 are Pogo pins. It may be understood that the Pogo pin is a precision connector used in an electronic product such as a mobile phone, is widely used in semiconductor devices, and performs a connection function. For related descriptions of the Pogo pin, refer to a related technical document. Details are not described herein.

In a possible implementation, both the two contact points on the electronic device 100 are pin headers, and both the two contact points on the keyboard 200 are pin needles. The pin header may be understood as a metal patch, and the pin needle may be understood as a metal spring needle. After the pin header is in contact with the pin needle, the pin needle can contract for better fitting and connection.

For example, the contact point 101 and the contact point 102 on the back surface of the electronic device 100 may be pin headers, and the contact point 203 and the contact point 204 on the second surface 2021 of the fastening part 202 of the keyboard 200 may be pin needles. For example, the contact point 103 and the contact point 104 on the back surface of the electronic device 100 may be pin headers, and the contact point 203 and the contact point 204 on the second surface 2021 of the fastening part 202 of the keyboard 200 may be pin needles. For example, the contact point 105 and the contact point 106 on the side edge of the electronic device 100 may be pin headers, and the contact point 205 and the contact point 206 on the first surface 2011 of the key part 201 of the keyboard 200 may be pin needles. For example, the contact point 107 and the contact point 108 on the side edge of the electronic device 100 may be pin headers, and the contact point 205 and the contact point 206 on the first surface 2011 of the key part 201 of the keyboard 200 may be pin needles.

In a possible implementation, both the two contact points on the electronic device 100 are pin needles, and both the two contact points on the keyboard 200 are pin headers.

In a possible implementation, the two contact points on the electronic device 100 are respectively a pin needle and a pin header, and the two contact points on the keyboard 200 are respectively a pin needle and a pin header. The pin needle on the electronic device 100 is in contact with the pin header on the keyboard 200, and the pin header on the electronic device 100 is in contact with the pin needle on the keyboard 200.

It should be noted that positions of the two contact points on the electronic device 100 are not limited to the foregoing example, and positions of the two contact points on the keyboard 200 are not limited to the foregoing example.

The following describes an apparatus provided in an embodiment of this application.

Figure 12:
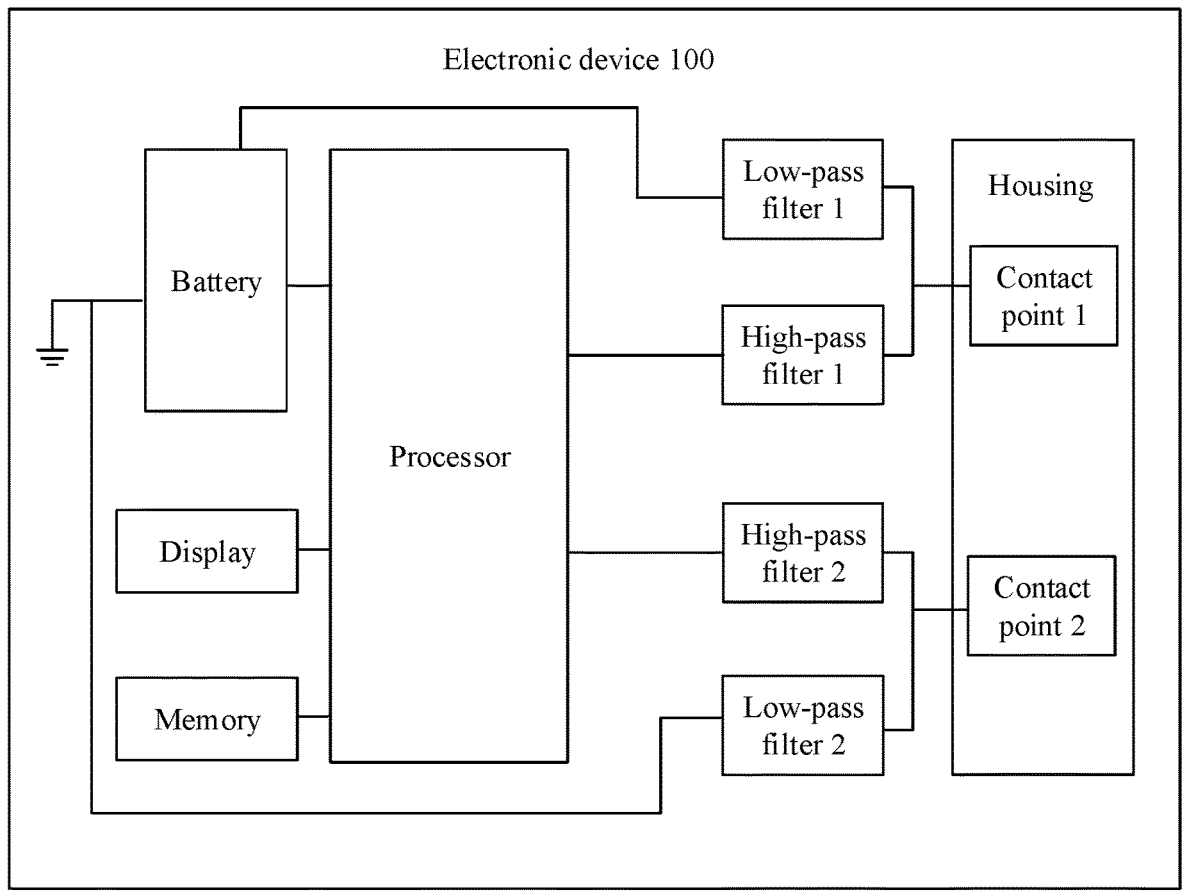
FIG. 12 is a schematic diagram of a hardware structure of an electronic device 100 according to an embodiment of this application.

FIG. 12 is a schematic diagram of a hardware structure of an electronic device 100 according to an embodiment of this application.

The electronic device 100 may include a processor, a memory, a display, a battery, a low-pass filter 1, a low-pass filter 2, a high-pass filter 1, a high-pass filter 2, and a housing. A contact point 1 and a contact point 2 are disposed on the housing.

The processor may include one or more processing units. For example, the processor may include an application processor (Application Processor, AP), a modem processor, a graphics processing unit (Graphics Processing unit, GPU), an image signal processor (namely, an ISP), a controller, a memory, a video codec, a digital signal processor (Digital Signal Processor, DSP), a baseband processor, and/or a neural-network processing unit (Neural-network Processing Unit, NPU). Different processing units may be independent devices, or may be integrated into one or more processors.

In some embodiments of this application, the processor may include one or more interfaces, for example, a USB interface. The USB interface is an interface that complies with USB standard specifications, and may be specifically a Mini USB interface, a Micro USB interface, a USB Type C interface, or the like. It may be understood that a full English name of USB is Universal Serial Bus, and a Chinese meaning is a universal serial bus, which is an external bus standard and is used to regulate a connection and communication between a computer and an external device. The interface included in the processor may be further configured to be connected to another electronic device, for example, an AR device.

In the embodiment provided in this application, the processor in the electronic device 100 may process received key position information to obtain corresponding coding information, for example, an ASCII code.

It may be understood that a full English name of ASCII is American Standard Code for Information Interchange, and a Chinese meaning is American Standard Code for Information Interchange. ASCII is a computer coding system based on Latin letters. The ASCII code uses a specified combination of 7-bit or 8-bit binary numbers to represent 128 or 256 possible characters. The standard ASCII code is also referred to as a basic ASCII code, and uses a 7-bit binary number (the remaining 1-bit binary number is 0) to represent all uppercase and lowercase letters, numbers 0 to 9, punctuation marks, and special control characters used in American English.

The display is configured to display an image, a video, and the like. The display includes a display panel. The display panel may be a liquid crystal display (Liquid Crystal Display, LCD), an organic light-emitting diode (Organic Light-Emitting Diode, OLED), an active-matrix organic light emitting diode (Active-Matrix Organic Light Emitting Diode, AMOLED), a flex light-emitting diode (Flex Light-Emitting Diode, FLED), a Mini LED, a Micro LED, a Micro-OLED, a quantum dot light emitting diode (Quantum Dot Light Emitting Diodes, QLED), or the like. In some embodiments, the electronic device 100 may include one or N displays, where N is a positive integer greater than 1.

In the embodiment provided in this application, the electronic device 100 may display, on the display, content entered by a user by using a keyboard 200.

The battery is configured to supply power to the electronic device 100. It may be understood that the battery in the electronic device 100 may be a lithium battery. In some embodiments of this application, the electronic device 100 may further include a charging management module and a power management model. The charging management module is configured to receive charging input from a charger. When charging the battery, the charging management module may further supply power to the electronic device 100 through the power management module.

In the embodiment provided in this application, the battery in the electronic device 100 may further supply power to the keyboard 200. Specifically, the battery in the electronic device 100 transmits a power signal and a GND signal to the keyboard 200, to supply power to the keyboard 200.

It may be understood that the low-pass filter is an electronic filtering apparatus that allows a signal less than a cut-off frequency to pass and that does not allow a signal greater than the cut-off frequency to pass. That is, the low-pass filter 1 and the low-pass filter 2 are configured to filter out a high-frequency signal. In the embodiment provided in this application, the low-pass filter 1 may allow the power signal to pass, and the low-pass filter 2 may allow the GND signal to pass.

In some embodiments of this application, the low-pass filter 1 and the low-pass filter 2 may be beads. The bead has relatively high resistivity and magnetic permeability, and may be equivalent to a series connection of a resistor and an inductor. However, both a resistance value and an inductance value change with a frequency. The bead exhibits resistance at a high frequency, and can maintain relatively high impedance in a relatively wide frequency range. Therefore, by selecting a bead with a proper parameter, a signal with a relatively high frequency can be effectively filtered out, so that the power signal/GND signal with a relatively low frequency passes. It may be understood that parameters of beads corresponding to the low-pass filter 1 and the low-pass filter 2 may be set based on an actual requirement. This is not limited in this application. For example, resistance values of the beads corresponding to the low-pass filter 1 and the low-pass filter 2 may be not less than 100 ohms. For example, the low-pass filter 1 may be a 100-ohm bead. For example, the low-pass filter 2 may be a 150-ohm bead. For another example, resistance values of the beads corresponding to the low-pass filter 1 and the low-pass filter 2 may be not less than 100 ohms and not greater than 500 ohms.

Figure 13:
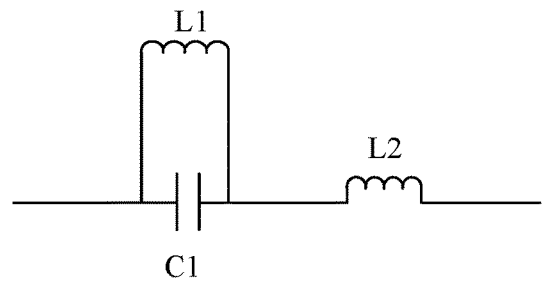
FIG. 13 is a schematic diagram of a structure of a low-pass filter 1 according to an embodiment of this application.

In some embodiments of this application, the low-pass filter 1 may include a capacitor and an inductor. As shown in FIG. 13, the low-pass filter 1 may include a capacitor C1 and an inductor L1 that are connected in parallel, and an inductor L2 that is connected in series to the capacitor C1 and the inductor L1. The capacitor C1 has 10 nanofarads, the inductor L1 has 150 microhenries, and the inductor L2 has 100 microhenries. Similarly, the low-pass filter 2 may also include a capacitor and an inductor. For a structure of the low-pass filter 2, refer to a structure of the low-pass filter 1 (as shown in FIG. 13).

Figure 14:
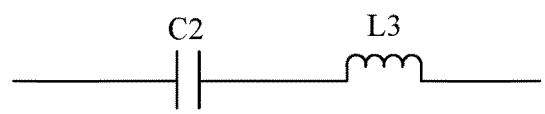
FIG. 14 is a schematic diagram of a structure of a high-pass filter 1 according to an embodiment of this application.

In some embodiments of this application, the high-pass filter 1 may include a capacitor and an inductor. As shown in FIG. 14, the high-pass filter 1 may include a capacitor C2 and an inductor L3 that are connected in series. The capacitor C2 has 1 nanofarad, and the inductor L3 has 100 nanohenries. In this case, a signal in a range of 3 MHz-70 MHz passes through the high-pass filter 1 with almost no attenuation, and a signal on another frequency band is blocked by the high-pass filter 1. It should be noted that the high-pass filter 1 may alternatively have another structure. This is not limited in this application. For example, the high-pass filter 1 may alternatively include more capacitors and/or inductors. For another example, a parameter of a capacitor and/or an inductor included in the high-pass filter 1 may change. Similarly, the high-pass filter 2 may also include a capacitor and an inductor. For a structure of the high-pass filter 2, refer to the structure of the high-pass filter 1 (as shown in FIG. 14).

The contact point 1 and the contact point 2 are disposed on the housing of the electronic device 100. The contact point 1 is connected to each of the low-pass filter 1 and the high-pass filter 1. The contact point 2 is connected to each of the low-pass filter 2 and the high-pass filter 2.

It may be understood that the contact point 1 and the contact point 2 are contact points visible to the user. Actually, the contact point 1 and the contact point 2 are merely a part of a connector, and most of the connector is inside the electronic device 100, and is invisible to the user. It may be understood that the connector performs a connection function, and the connector may be the Pogo pin described above.

With reference to the foregoing description, in some embodiments of this application, the contact point 1 may be the contact point 101, and the contact point 2 may be the contact point 102. In some embodiments of this application, the contact point 1 may be the contact point 103, and the contact point 2 may be the contact point 104. In some embodiments of this application, the contact point 1 may be the contact point 105, and the contact point 2 may be the contact point 106. In some embodiments of this application, the contact point 1 may be the contact point 107, and the contact point 2 may be the contact point 108.

It may be understood that the structure shown in this embodiment of the present invention does not constitute a specific limitation on the electronic device 100. In some other embodiments of this application, the electronic device 100 may include more or fewer components than those shown in the figure, some components may be combined, some components may be split, or there may be different component arrangements. The components shown in the figure may be implemented by using hardware, software, or a combination of software and hardware.

Figure 15:
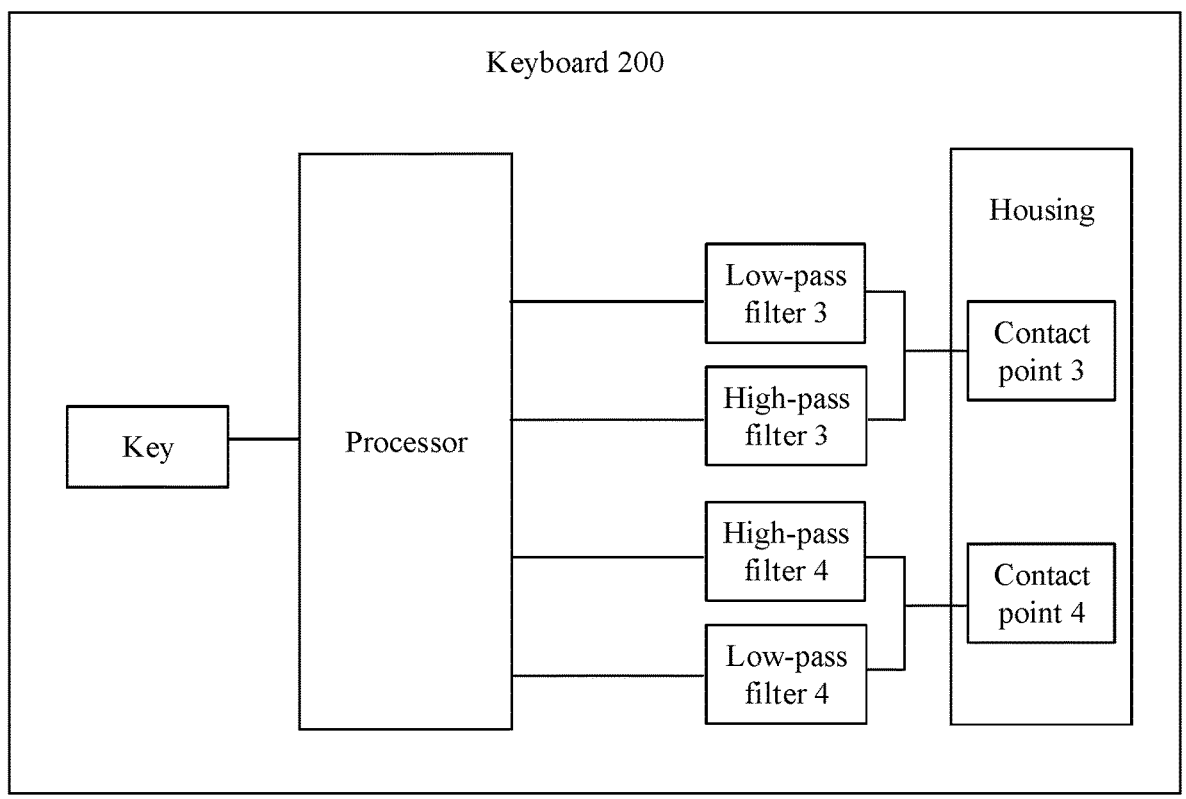
FIG. 15 is a schematic diagram of a hardware structure of a keyboard 200 according to an embodiment of this application.

FIG. 15 is a schematic diagram of a hardware structure of a keyboard 200 according to an embodiment of this application.

The keyboard 200 may include a processor, a key, a low-pass filter 3, a low-pass filter 4, a high-pass filter 3, a high-pass filter 4, and a housing. A contact point 3 and a contact point 4 are disposed on the housing.

For the processor in the keyboard 200, refer to the foregoing related description of the processor in the electronic device 100. Details are not described herein in this application.

In the embodiment provided in this application, the processor in the keyboard 200 may receive a power signal and a GND signal that are transmitted by the electronic device 100. The processor in the keyboard 200 may further transmit key position information to the electronic device 100.

In some embodiments of this application, the processor in the keyboard 200 may be disposed on a circuit board in the keyboard 200. A logic circuit and a control circuit may further be disposed on the circuit board in the keyboard 200. The logic circuit may include several key switches. Each key may be connected to one key switch. The key switch is used to determine whether the corresponding key is pressed. The control circuit is configured to: identify a pressed key and obtain a position code corresponding to the key. The control circuit may include a key identification scanning circuit, a coding circuit, an interface circuit, and the like. For descriptions of the key identification scanning circuit, the coding circuit, and the interface circuit, refer to a related technical document. Details are not described herein.

The contact point 3 and the contact point 4 are disposed on the housing of the keyboard 200. The contact point 3 is connected to the low-pass filter 3 and the high-pass filter 3. The contact point 4 is connected to the low-pass filter 4 and the high-pass filter 4.

It may be understood that for a structure of the low-pass filter 3, refer to the structure of the low-pass filter 2; for a structure of the low-pass filter 4, refer to the structure of the low-pass filter 1; for a structure of the high-pass filter 3, refer to the structure of the high-pass filter 2; and for a structure of the high-pass filter 4, refer to the structure of the high-pass filter 1.

It may be understood that the contact point 3 and the contact point 4 are contact points visible to a user. Actually, the contact point 3 and the contact point 4 are merely a part of a connector, and most of the connector is inside the keyboard 200, and is invisible to the user. It may be understood that the connector performs a connection function, and the connector may be the Pogo pin described above.

With reference to the foregoing description, in some embodiments of this application, the contact point 3 may be the contact point 203, and the contact point 4 may be the contact point 204. In some embodiments of this application, the contact point 3 may be the contact point 205, and the contact point 4 may be the contact point 206.

It may be understood that the structure shown in this embodiment of the present invention does not constitute a specific limitation on the keyboard 200. In some other embodiments of this application, the keyboard 200 may include more or fewer components than those shown in the figure, some components may be combined, some components may be split, or there may be different component arrangements. The components shown in the figure may be implemented by using hardware, software, or a combination of software and hardware.

The following describes a signal transmission method provided in an embodiment of this application.

Figure 16:
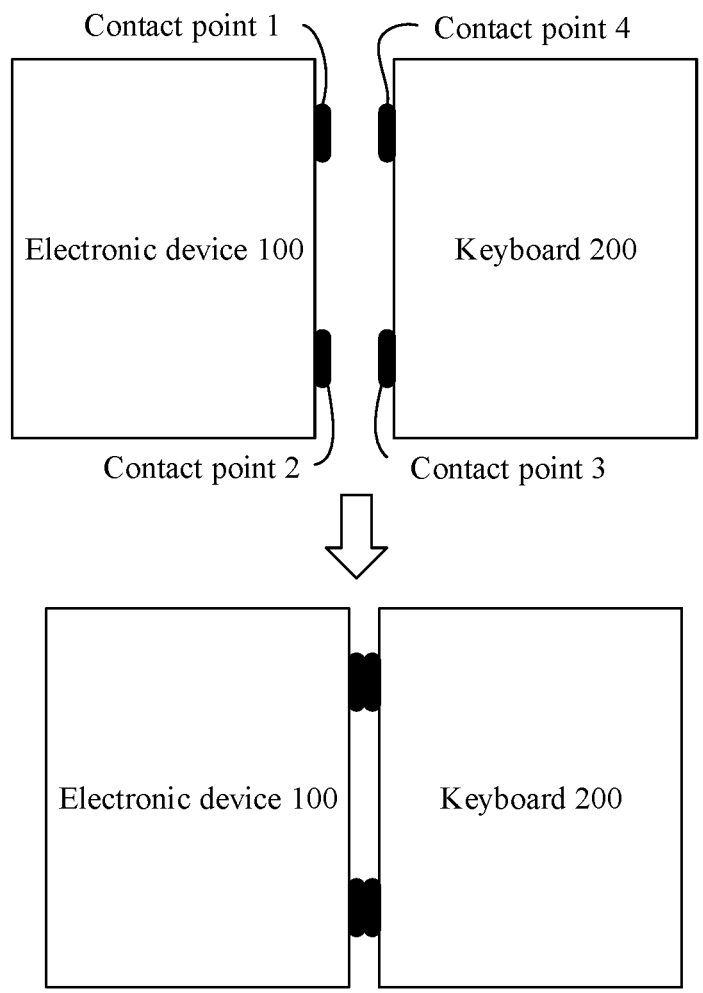
FIG. 16 is another schematic diagram of a connection between an electronic device 100 and a keyboard 200 according to an embodiment of this application.

Based on the foregoing content, when two contact points on an electronic device 100 are respectively in contact with two contact points on a keyboard 200, the electronic device 100 transmits a power signal and a GND signal to the keyboard 200 through the contact points that are in contact with each other, and the keyboard 200 transmits key position information to the electronic device 100 through the contact points that are in contact with each other. As shown in FIG. 16, the electronic device 100 includes a contact point 1 and a contact point 2, and the keyboard 200 includes a contact point 3 and a contact point 4. The contact point 1 on the electronic device 100 may be in contact with the contact point 4 on the keyboard 200, and the contact point 2 on the electronic device 100 may be in contact with the contact point 3 on the keyboard 200. In this case, the electronic device 100 may transmit the power signal to the keyboard 200 through the contact point 1 and the contact point 4, and may further transmit the GND signal to the keyboard 200 through the contact point 2 and the contact point 3; and the keyboard 200 may transmit the key position information to the electronic device 100 through the contact point 4 and the contact point 1, and may further transmit the key position information to the electronic device 100 through the contact point 3 and the contact point 2.

In some embodiments of this application, before the keyboard 200 transmits the key position information to the electronic device 100, the electronic device 100 may send information to the keyboard 200 to request to communicate with the keyboard 200. After receiving the information, the keyboard 200 may send an ACK signal to the electronic device 100. After sending the ACK signal, the keyboard 200 may send the key position information to the electronic device 100.

It may be understood that the key position information may include a position code. The position code may be used to indicate a position of a key. In some embodiments of this application, the keyboard 200 determines, by using a key identification scanning circuit and a coding circuit, a position of a key pressed by a user, and obtains a position code of the pressed key. An ACK (Acknowledge character) is an acknowledgment character, and in data communication, is a transmission-type control character sent by a receiving station to a sending station. The ACK indicates that it is determined that sent data is correctly received. In a TCP/IP protocol, if a receiver successfully receives data, ACK data is returned. In this application, the ACK signal is used to indicate that the keyboard 200 establishes a communication connection to the electronic device 100.

Specifically, two low-pass filters and two high-pass filters, namely, a low-pass filter 1, a low-pass filter 2, a high-pass filter 1, and a high-pass filter 2, may be disposed in the electronic device 100. Each of the low-pass filter 1 and the high-pass filter 1 may be connected to the contact point 1, and each of the high-pass filter 2 and the low-pass filter 2 may be connected to the contact point 2. Two low-pass filters and two high-pass filters, namely, a low-pass filter 3, a low-pass filter 4, a high-pass filter 3, and a high-pass filter 4, may be disposed in the keyboard 200. Each of the low-pass filter 3 and the high-pass filter 3 may be connected to the contact point 3, and each of the low-pass filter 4 and the high-pass filter 4 may be connected to the contact point 4.

It may be understood that the power signal in the electronic device 100 passes through the low-pass filter 1, and then may be transmitted to the keyboard 200 through the contact point 1 and the contact point 4. The GND signal in the electronic device 100 passes through the low-pass filter 2, and then may be transmitted to the keyboard 200 through the contact point 2 and the contact point 3. After receiving a signal transmitted through the contact point 4, the keyboard 200 may pass the signal through the low-pass filter 4, to obtain the power signal. Similarly, after receiving a signal transmitted through the contact point 3, the keyboard 200 may pass the signal through the low-pass filter 3, to obtain the GND signal.

The key position information in the keyboard 200 passes through the high-pass filter 4, and then may be transmitted to the electronic device 100 through the contact point 4 and the contact point 1. The key position information in the keyboard 200 may further pass through the high-pass filter 3, and then be transmitted to the electronic device 100 through the contact point 3 and the contact point 2. After receiving a signal transmitted through the contact point 1, the electronic device 100 may pass the signal through the high-pass filter 1, to obtain the key position information. Similarly, after receiving a signal transmitted through the contact point 2, the electronic device 100 may pass the signal through the high-pass filter 2, to obtain the key position information.

Figure 17:
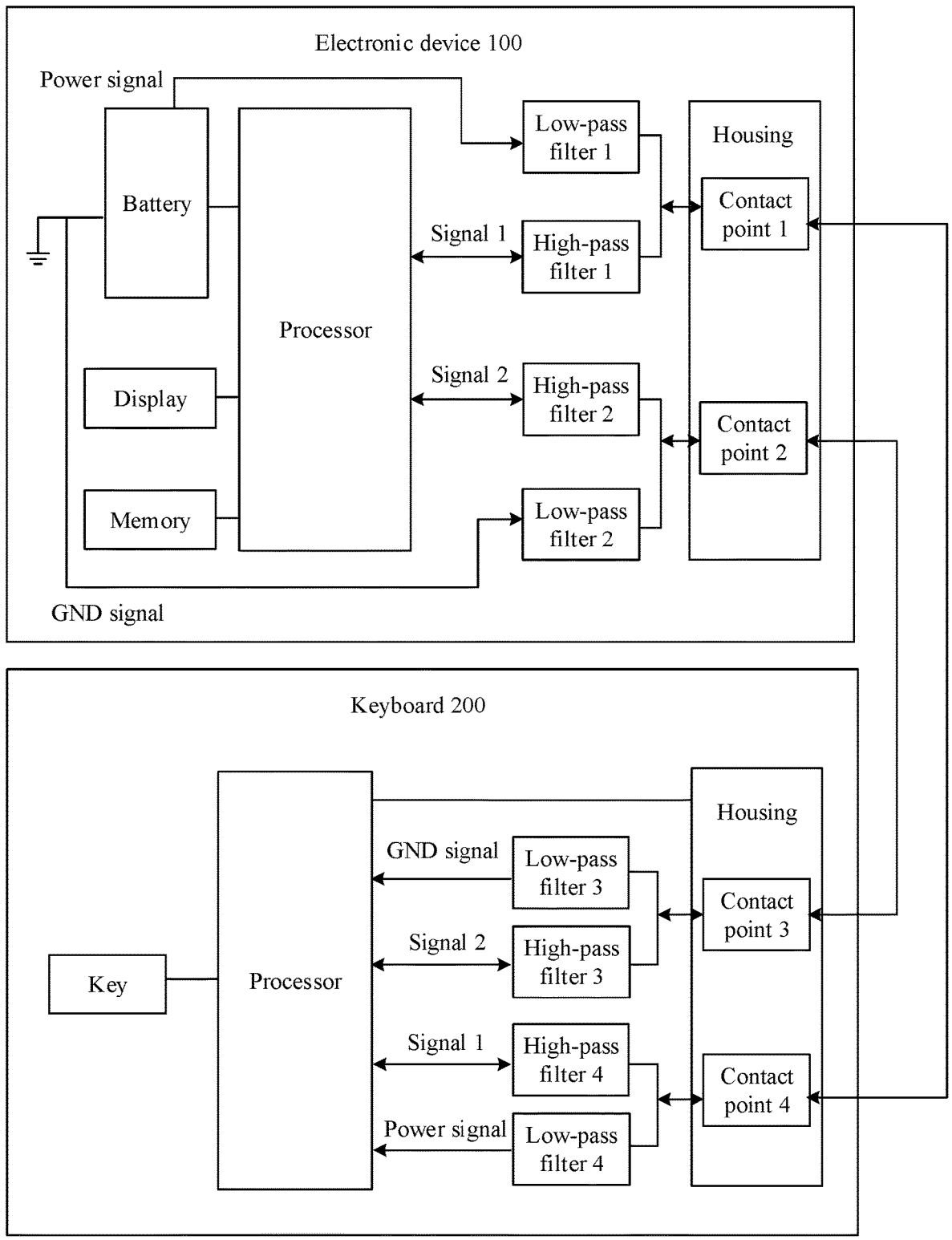
FIG. 17 is a schematic diagram of a signal transmission process according to an embodiment of this application.

The following further describes the foregoing signal transmission process with reference to FIG. 17.

When the two contact points on the electronic device 100 are respectively in contact with the two contact points on the keyboard 200, the electronic device 100 may supply power to the keyboard 200. As shown in FIG. 17, the power signal in the electronic device 100 is transmitted from a battery to the low-pass filter 1, then to the contact point 4 on the keyboard 200 through the contact point 1, and finally to a processor in the keyboard 200 through the low-pass filter 4. Similarly, the GND signal in the electronic device 100 is transmitted from the battery to the low-pass filter 2, then to the contact point 3 on the keyboard 200 through the contact point 2, and finally to the processor in the keyboard 200 through the low-pass filter 3. It may be understood that both the power signal and the GND signal are low-frequency signals. For example, a frequency of each of the power signal and the GND signal may fall within a range of 1 Hz-100 Hz.

It should be noted that the electronic device 100 and the keyboard 200 may further transmit a high-frequency signal. A signal 1 and a signal 2 shown in FIG. 17 are high-frequency signals.

When the electronic device 100 supplies power to the keyboard 200, the user may tap the key on the keyboard 200 to perform input. The keys on the keyboard 200 and logic circuits corresponding to the keys are arranged in a matrix shape. Therefore, the keyboard 200 may determine, by using the key identification scanning circuit, the position of the key pressed by the user, to obtain position information of the key pressed by the user. The keyboard 200 may transmit the key position information to the electronic device 100. As shown in FIG. 17, the signal 1 may include the key position information, and the signal 2 may also include the key position information. The keyboard 200 may transmit the signal 1 to the high-pass filter 4, then to the contact point 1 on the electronic device 100 through the contact point 4, and finally to a processor in the electronic device 100 through the high-pass filter 1. Similarly, the keyboard 200 may transmit the signal 2 to the high-pass filter 3, then to the contact point 2 on the electronic device 100 through the contact point 3, and finally to the processor in the electronic device 100 through the high-pass filter 2.

In some embodiments of this application, the signal 1 and the signal 2 are signals obtained after position codes are packaged. That is, the signal 1 and the signal 2 include a plurality of position codes. In some embodiments of this application, the signal 1 and the signal 2 are USB signals. In some embodiments of this application, the signal 1 and the signal 2 are I2C signals. It may be understood that for related descriptions of the USB signal, refer to a USB communication protocol and a related standard. A full English name of I2C is Inter-Integrated Circuit, which literally means inter-integrated circuit. For related descriptions of the I2C signal, refer to an I2C communication protocol and a related standard. For example, when the signal 1 and the signal 2 are USB signals, a frequency of each of the signal 1 and the signal 2 is 12 MHz. For example, when the signal 1 and the signal 2 are I2C signals, a frequency of each of the signal 1 and the signal 2 may be 100 KHz. For example, when the signal 1 and the signal 2 are I2C signals, a frequency of each of the signal 1 and the signal 2 may alternatively be 400 KHz. For example, when the signal 1 and the signal 2 are I2C signals, a frequency of each of the signal 1 and the signal 2 may alternatively be 1 MHz.

In some embodiments of this application, when the signal 1 is a USB signal, each of the low-pass filter 1, the low-pass filter 2, the low-pass filter 3, and the low-pass filter 4 may include a bead not less than 100 ohms. For details, refer to the foregoing description of the low-pass filter 1. Details are not described herein. Similarly, when the signal 2 is a USB signal, each of the low-pass filter 1, the low-pass filter 2, the low-pass filter 3, and the low-pass filter 4 may include a bead not less than 100 ohms. For details, refer to the foregoing description of the low-pass filter 1. Details are not described herein.

In some embodiments of this application, when the signal 1 is an I2C signal, each of the low-pass filter 1, the low-pass filter 2, the low-pass filter 3, and the low-pass filter 4 may include a capacitor and an inductor. For details, refer to the foregoing description of the low-pass filter 1 and FIG. 13. Details are not described herein. Similarly, when the signal 2 is I2C, each of the low-pass filter 1, the low-pass filter 2, the low-pass filter 3, and the low-pass filter 4 may include a capacitor and an inductor. For details, refer to the foregoing description of the low-pass filter 1 and FIG. 13. Details are not described herein.

In some embodiments of this application, the keyboard 200 may send the signal 1 or the signal 2 to the electronic device 100, to transmit the key position information to the electronic device 100. In some embodiments of this application, the keyboard 200 may send the signal 1 and the signal 2 to the electronic device 100, to transmit the key position information to the electronic device 100.

It may be understood that after receiving the key position information sent by the keyboard 200, the electronic device 100 may process the key position information by using the processor, to determine input content. The input content may be understood as a character represented by the key pressed by the user.

In some embodiments of this application, when the two contact points on the electronic device 100 are respectively in contact with the two contact points on the keyboard 200, the electronic device 100 may send a communication request to the keyboard 200. In this case, the signal 1 and the signal 2 may be the communication request sent by the electronic device 100 to the keyboard 200. As shown in FIG. 17, the electronic device 100 may transmit the signal 1 to the high-pass filter 1, then to the contact point 4 on the keyboard 200 through the contact point 1, and finally to the processor in the keyboard 200 through the high-pass filter 4. Similarly, the electronic device 100 may transmit the signal 2 to the high-pass filter 2, then to the contact point 3 on the keyboard 200 through the contact point 2, and finally to the processor in the keyboard 200 through the high-pass filter 3.

In some embodiments of this application, the electronic device 100 may send the signal 1 to the keyboard 200 to request communication. In some other embodiments of this application, the electronic device 100 may send the signal 2 to the keyboard 200 to request communication.

In some embodiments of this application, after receiving the communication request sent by the electronic device 100, the keyboard 200 may send an ACK signal to the electronic device 100. As shown in FIG. 17, the signal 1 and the signal 2 may be ACK signals. It may be understood that the keyboard 200 may send a signal 1 to the electronic device 100 to agree to perform communication, and establish a communication connection. The keyboard 200 may alternatively send a signal 2 to the electronic device 100 to agree to perform communication, and establish a communication connection.

It may be understood that the keyboard 200 may alternatively send another type of signal to the electronic device 100 to agree to establish a communication connection to the electronic device 100. This is not limited in this application.

The foregoing embodiments are merely used to describe the technical solutions of this application, but are not used to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A signal transmission method, applied to an electronic device in which a first low-pass filter, a second low-pass filter, a first high-pass filter, a second high-pass filter, a first contact point, and a second contact point are disposed, wherein each of the first low-pass filter and the first high-pass filter is connected to the first contact point, each of the second low-pass filter and the second high-pass filter is connected to the second contact point, the second contact point is configured to be in contact with a third contact point on a keyboard, the first contact point is configured to be in contact with a fourth contact point on the keyboard, and the method comprises:

transmitting, by the electronic device, a power signal to the first contact point through the first low-pass filter, and transmitting a GND signal to the second contact point through the second low-pass filter;

sending, by the electronic device, first information processed by the first high-pass filter to the keyboard through the first contact point; or sending, by the electronic device, first information processed by the second high-pass filter to the keyboard through the second contact point, wherein the first information is used to request the keyboard to establish a communication connection;

receiving, by the electronic device through the first contact point, second information sent by the keyboard, and processing the second information through the first high-pass filter; or receiving, by the electronic device, the second information through the second contact point, and processing the second information through the second high-pass filter, wherein the second information is used to indicate that the keyboard establishes a communication connection to the electronic device; and receiving, by the electronic device, key position information transmitted by the keyboard to the first contact point, and processing, through the first high-pass filter, the key position information transmitted to the first contact point; receiving, by the electronic device, key position information transmitted by the keyboard to the second contact point, and processing, through the second high-pass filter, the key position information transmitted to the second contact point; or receiving, by the electronic device, key position information transmitted by the keyboard to the first contact point, processing, through the first high-pass filter, the key position information transmitted to the first contact point, receiving key position information transmitted by the keyboard to the second contact point, and processing, through the second high-pass filter, the key position information transmitted to the second contact point.

2. The method according to claim 1, wherein the first low-pass filter comprises a bead not less than 100 ohms, the second low-pass filter comprises a bead not less than 100 ohms, the first high-pass filter comprises at least one capacitor and at least one inductor, and the second high-pass filter comprises at least one capacitor and at least one inductor.

3. The method according to claim 1, wherein the key position information is a USB signal.

4. The method according to claim 1, wherein the key position information is an I2C signal.

5. The method according to claim 4, wherein the first low-pass filter comprises at least two inductors and at least one capacitor, the second low-pass filter comprises at least two inductors and at least one capacitor, the first high-pass filter comprises at least one capacitor and at least one inductor, and the second high-pass filter comprises at least one capacitor and at least one inductor.

6. A non-transitory computer storage medium, comprising: computer instructions, wherein when the computer instructions are run on an electronic device, the electronic device is enabled to perform the method according to claim 1.

7. An electronic device, wherein the electronic device comprises a first low-pass filter, a second low-pass filter, a first high-pass filter, a second high-pass filter, a first contact point, and a second contact point, each of the first low-pass filter and the first high-pass filter is connected to the first contact point, and each of the second low-pass filter and the second high-pass filter is connected to the second contact point;

the second contact point is configured to be in contact with a third contact point on a keyboard;
the first contact point is configured to be in contact with a fourth contact point on the keyboard;
the first low-pass filter is configured to transmit a power signal to the first contact point;
the second low-pass filter is configured to transmit a GND signal to the second contact point;
the first high-pass filter is configured to process key position information transmitted by the keyboard to the first contact point; the second high-pass filter is configured to process key position information transmitted by the keyboard to the second contact point; or the first high-pass filter is configured to process key position information transmitted by the keyboard to the first contact point, and the second high-pass filter is configured to process key position information transmitted by the keyboard to the second contact point;
the first high-pass filter is further configured to transmit first information to the first contact point; or the second high-pass filter is further configured to transmit the first information to the second contact point, wherein the first information is used to request the keyboard to establish a communication connection; and
the first high-pass filter is further configured to process second information transmitted by the keyboard to the first contact point; or the second high-pass filter is further configured to process second information transmitted by the keyboard to the second contact point, wherein the second information is used to indicate that the keyboard establishes a communication connection to the electronic device.

8. The electronic device according to claim 7, wherein the first low-pass filter comprises a bead not less than 100 ohms, the second low-pass filter comprises a bead not less than 100 ohms, the first high-pass filter comprises at least one capacitor and at least one inductor, and the second high-pass filter comprises at least one capacitor and at least one inductor.

9. The electronic device according to claim 8, wherein the first high-pass filter is further configured to transmit first information to the first contact point; or the second high-pass filter is further configured to transmit the first information to the second contact point, wherein the first information is used to request the keyboard to establish a communication connection; and
the first high-pass filter is further configured to process second information transmitted by the keyboard to the first contact point; or the second high-pass filter is further configured to process second information transmitted by the keyboard to the second contact point, wherein the second information is used to indicate that the keyboard establishes a communication connection to the electronic device.

10. The electronic device according to claim 7, wherein the first low-pass filter comprises at least two inductors and at least one capacitor, the second low-pass filter comprises at least two inductors and at least one capacitor, the first high-pass filter comprises at least one capacitor and at least one inductor, and the second high-pass filter comprises at least one capacitor and at least one inductor.

11. The electronic device according to claim 10, wherein the first high-pass filter is further configured to transmit first information to the first contact point; or the second high-pass filter is further configured to transmit the first information to the second contact point, wherein the first information is used to request the keyboard to establish a communication connection; and the first high-pass filter is further configured to process second information transmitted by the keyboard to the first contact point; or the second high-pass filter is further configured to process second information transmitted by the keyboard to the second contact point, wherein the second information is used to indicate that the keyboard establishes a communication connection to the electronic device.

12. A keyboard, wherein the keyboard comprises a third low-pass filter, a fourth low-pass filter, a third high-pass filter, a fourth high-pass filter, a third contact point, and a fourth contact point, each of the third low-pass filter and the third high-pass filter is connected to the third contact point, and each of the fourth low-pass filter and the fourth high-pass filter is connected to the fourth contact point;

the fourth contact point is configured to be in contact with a first contact point on an electronic device;

the third contact point is configured to be in contact with a second contact point on the electronic device;

the third low-pass filter is configured to process a GND signal transmitted by the electronic device to the third contact point;

the fourth low-pass filter is configured to process a power signal transmitted by the electronic device to the fourth contact point;

the third high-pass filter is configured to transmit key position information to the third contact point; the fourth high-pass filter is configured to transmit the key position information to the fourth contact point; or the third high-pass filter is configured to transmit the key position information to the third contact point, and the fourth high-pass filter is configured to transmit the key position information to the fourth contact point;

the third high-pass filter is further configured to process first information transmitted by the electronic device to the third contact point; or the fourth high-pass filter is further configured to process first information transmitted by the electronic device to the fourth contact point, wherein the first information is used to request the keyboard to establish a communication connection; and the third high-pass filter is further configured to transmit second information to the third contact point; or the fourth high-pass filter is further configured to transmit the second information to the fourth contact point, wherein the second information is used to indicate that the keyboard establishes a communication connection to the electronic device.

13. The keyboard according to claim 12, wherein the third low-pass filter comprises a bead not less than 100 ohms, the fourth low-pass filter comprises a bead not less than 100 ohms, the third high-pass filter comprises at least one capacitor and at least one inductor, and the fourth high-pass filter comprises at least one capacitor and at least one inductor.

14. The keyboard according to claim 13, wherein the third high-pass filter is further configured to process first information transmitted by the electronic device to the third contact point; or the fourth high-pass filter is further configured to process first information transmitted by the electronic device to the fourth contact point, wherein the first information is used to request the keyboard to establish a communication connection; and the third high-pass filter is further configured to transmit second information to the third contact point; or the fourth high-pass filter is further configured to transmit the second information to the fourth contact point, wherein the second information is used to indicate that the keyboard establishes a communication connection to the electronic device.

15. The keyboard according to claim 12, wherein the third low-pass filter comprises at least two inductors and at least one capacitor, the fourth low-pass filter comprises at least two inductors and at least one capacitor, the third high-pass filter comprises at least one capacitor and at least one inductor, and the fourth high-pass filter comprises at least one capacitor and at least one inductor.

16. The keyboard according to claim 15, wherein the third high-pass filter is further configured to process first information transmitted by the electronic device to the third contact point; or the fourth high-pass filter is further configured to process first information transmitted by the electronic device to the fourth contact point, wherein the first information is used to request the keyboard to establish a communication connection; and the third high-pass filter is further configured to transmit second information to the third contact point; or the fourth high-pass filter is further configured to transmit the second information to the fourth contact point, wherein the second information is used to indicate that the keyboard establishes a communication connection to the electronic device.

* * * * *